(12) United States Patent
Jaworski et al.

(10) Patent No.: US 12,295,387 B2
(45) Date of Patent: May 13, 2025

(54) SYSTEM AND METHOD OF FORMULATING AN ANIMAL FEED COMPOSITION

(71) Applicant: Nutreco IP Assets B.V., Boxmeer (NL)

(72) Inventors: Neil Jaworski, Boxmeer (NL);
Coenraad Henricus Maria Smits, Boxmeer (NL); Ronald Busink, Boxmeer (NL)

(73) Assignee: Nutreco IP Assets B.V., Boxmeer (NL)

(*) Notice: Subject to any disclaimer, the term of this patent is extended or adjusted under 35 U.S.C. 154(b) by 704 days.

(21) Appl. No.: 17/535,378

(22) Filed: Nov. 24, 2021

(65) Prior Publication Data

US 2022/0079189 A1  Mar. 17, 2022

Related U.S. Application Data

(63) Continuation of application No. PCT/EP2020/065070, filed on May 29, 2020.
(Continued)

(30) Foreign Application Priority Data

Jun. 20, 2019 (EP) .................................... 19181503

(51) Int. Cl.
*A23K 20/147* (2016.01)
*A23K 50/30* (2016.01)
*G05B 15/02* (2006.01)

(52) U.S. Cl.
CPC ............ *A23K 20/147* (2016.05); *A23K 50/30* (2016.05); *G05B 15/02* (2013.01)

(58) Field of Classification Search
CPC ...... A23K 20/147; A23K 50/30; A23K 20/30; A23K 40/00; A23K 50/60; A23K 50/75;
(Continued)

(56) References Cited

U.S. PATENT DOCUMENTS 10,265,366 B2 * 4/2019 Koppe ................. A23K 20/111
11,419,350 B2 * 8/2022 Rakitsky ................ A23K 10/22
(Continued)

FOREIGN PATENT DOCUMENTS

| CN | 1069631 A | 3/1993 |
| CN | 107655985 A | 2/2018 |
| WO | WO-2019/035756 A1 | 2/2019 |

OTHER PUBLICATIONS

Bryan Dervan D S L et al., "Digestion kinetics of protein sources determined using an in vitro chicken model", Animal Feed Science and Technology, vol. 248, Feb. 28, 2019, pp. 106-113.
(Continued)

*Primary Examiner* — Ramesh B Patel
(74) *Attorney, Agent, or Firm* — FOLEY & LARDNER LLP (57) ABSTRACT

A system for formulating a feed composition for an animal is described, comprising (i) a feed ingredient data storage, the feed ingredients comprising nutrients having first, second and third digestion rates different from each other, (ii) a nutrient regime data storage that has stored therein a nutrient regime for the animal in terms of a respective feeding amount of the nutrients, (iii) a feed composition processor communicatively connected to the feed ingredient data storage and to the nutrient regime data storage and configured to derive a feed composition.

27 Claims, 2 Drawing Sheets

Related U.S. Application Data (60) Provisional application No. 62/853,891, filed on May 29, 2019.

(58) Field of Classification Search
CPC ...... A23K 10/30; A23K 20/163; A23K 50/20; A23K 50/40; A23K 50/80; G05B 15/02; A23D 9/007; A23N 17/00; G06Q 50/02
See application file for complete search history.

(56) References Cited

U.S. PATENT DOCUMENTS

| | | | | |
|---|---|---|---|---|
| 12,004,489 | B2* | 6/2024 | Liet | A01K 5/004 |
| 2008/0215167 | A1* | 9/2008 | Beck | A23K 50/10 |
| | | | | 700/90 |
| 2008/0233248 | A1* | 9/2008 | Swenke | A23K 10/30 |
| | | | | 426/648 |
| 2012/0029077 | A1* | 2/2012 | Han | A23K 20/158 |
| | | | | 514/552 |
| 2015/0010671 | A1* | 1/2015 | Gaufres | A23K 10/12 |
| | | | | 426/2 |
| 2018/0077951 | A1* | 3/2018 | Jansen | A23K 50/75 |
| 2018/0125096 | A1* | 5/2018 | Ballinger, Jr. | A61K 39/395 |
| 2020/0141946 | A1* | 5/2020 | Li | C07K 1/34 |
| 2022/0015395 | A1* | 1/2022 | Draganovic | A23K 20/147 |
| 2024/0156129 | A1* | 5/2024 | Jones | A23K 20/22 |

OTHER PUBLICATIONS

Giuberti G et al., "Starch digestion and predicted glycemic index of cereal grains commonly utilized in pig nutrition", Animal Feed Science and Technology, Elsevier, Amsterdam, NL, vol. 174, No. 3, Mar. 9, 2012, pp. 163-173.

International Search Report and Written Opinion issued on PCT/EP2020/065070 mailed Jun. 17, 2020.

EP Search Report on EP Appl. Ser. No. 19181503 dated Dec. 2, 2019 (11 pages).

\* cited by examiner

| Feed ingredient | Total protein content (%) | Fast protein (%) | Slow protein (%) | Resistant protein (%) | Total starch content (%) | Fast starch (%) | Slow starch (%) | Resistant starch (%) | Total fiber (%) | Fast fiber (%) | Slow fiber (%) | Resistant fiber (%) |
|---|---|---|---|---|---|---|---|---|---|---|---|---|
| Wheat grain (100 g) | 13 | 75 | 20 | 5 | 65 | 90 | 7 | 3 | 3 | 35 | 40 | 25 |
| Casein (100 g) | 100 | 95 | 3 | 2 | | | | | | | | |
| Corn kernels (100 g) | 9 | 60 | 15 | 25 | 72 | 85 | 6 | 9 | 13 | 60 | 15 | 20 |
| .... | | | | | | | | | | | | |

| animal | Total protein (%) | Fast protein (%) | Slow protein (%) | Resistant protein (%) | Total starch (%) | Fast starch (%) | Slow starch (%) | Resistant starch (%) | Total fiber (%) | Fast fiber (%) | Slow fiber (%) | Resistant fiber (%) |
|---|---|---|---|---|---|---|---|---|---|---|---|---|
| Broilers age 1-7 days | 23 | 15 |  |  | 40 |  |  |  | 3.7 |  |  | 23 |
| Piglets age 1-7 days | 35 |  | 50 |  | 50 |  |  |  | 10 |  |  | 67 |
| Broilers age 8-25 days | 25 | 23 |  |  | 42 |  |  | 50 | 13 | 50 |  |  |
| …. |  |  |  |  |  |  |  |  |  |  |  |  |

Fig. 5

| animal | feed ingredient | Amount per 100 g feed composition |
|---|---|---|
| Broilers age 1-7 days | Corn kernels<br>Casein<br>Wheat<br>….<br>…. | 50<br>2<br>23<br>….<br>…. |
|  |  |  |
|  |  |  |
|  |  |  |

SYSTEM AND METHOD OF FORMULATING AN ANIMAL FEED COMPOSITION

CROSS-REFERENCE TO RELATED APPLICATIONS

The present application is a Continuation of International Patent Application No. PCT/EP2020/065070, filed May 29, 2020, which claims priority to: U.S. Provisional Patent Application No. 62/853,891; and Europe Patent Application No. 19181503.4 filed Jun. 20, 2019; the entire contents of all of which are hereby incorporated by reference.

FIELD OF THE INVENTION

The invention relates to a system and method for formulating a feed composition of an animal.

When feeding animals, an aim may be to enable maximum development of the animal in terms of mass, carcass, muscle development, growth, etc. Also, it may be desired to keep the animal in a good state of health and to achieve a balanced development of bones, muscles, organs, blood vessels, etc.

When feeding animals, a maximum target effect may be sought, for example achieving a certain development of the animal using a lowest cost feeding scheme. A desired nutrient composition may be determined, in terms of a total amount of e.g. protein and a total amount of carbohydrates, e.g. as a daily intake, and feed ingredients may be selected to adhere to the desired nutrient composition.

The invention aims to provide an improved system and method for formulating a feed composition of an animal.

The invention provides a system and method for formulating a feed composition of an animal, preferably a monogastric animal, such as a monogastric farming animal or a companion animal, including, without limitation, pseudomonogastrics such as lambs, swine, poultry, horses, fish and crustaceans, calves, dogs and cats, that takes into account the digestion or kinetics or the fermentation kinetics of one or more, preferably two or more, even more preferably three or more nutrients.

In order to achieve this aim, according to an aspect of the invention, there is provided a system for formulating a feed composition for an animal, comprising:
a feed ingredient data storage having stored therein for plural feed ingredients, the feed ingredients comprising at least two nutrients selected from a group comprising protein, starch and fiber,
  a content of respective first fractions of each one of the at least two nutrients exhibiting a first digestion rate,
  a content of respective second fractions of each one of the at least two nutrients exhibiting a second digestion rate, and
  a content of respective third fractions of each one of the at least two nutrients exhibiting a third digestion rate, the first, second and third digestion rates being different from each other, wherein the first digestion rate, the second digestion rate and the third digestion rate relate to a digestion in different parts of a digestive tract of the animal,
a nutrient regime data storage having stored therein a nutrient regime for the animal in terms of a respective feeding amount of at least one of
  the first fraction of one of the at least two nutrients having the first digestion rate,
  the second fraction of the one of the at least two nutrients having the second digestion rate, and
  the third fraction of the one of the at least two nutrients having the third digestion rate, and
a respective feeding amount of at least one of
  the first fraction of another one of the at least two nutrients having the first digestion rate,
  the second fraction of the other one of the at least two nutrients having the second digestion rate, and
  the third fraction of the other one of the at least two nutrients having the third digestion rate,
a feed composition processor communicatively connected to the feed ingredient data storage and to the nutrient regime data storage and configured
  to derive, from the nutrient regime for the animal and the contents of the respective first, second and third fractions of the at least two nutrients as stored in the feed ingredient data storage for the feed ingredients, a feed composition in terms of feed ingredients to be fed to the animal, the feed composition adhering to the nutrient regime, and
  to output instructions for dispensing the feed ingredients for feeding the animal based on the feed composition.

The feed ingredient data storage has stored therein data for plural feed ingredients. Examples of the feed ingredients include, without limitation: bakery meal, barley, feather meal, fish meal, horse beans, linseed, lucerne, lupins, maize, maize distillers dried grains with solubles, maize gluten feed, maize gluten meal, meat and bone meal, oat hulls, oats, dehulled oats, palm kernel meal, pea flakes, pea protein, pea starch, peas, pork meal, potato protein concentrate, poultry meal, hydrolyzed poultry protein, rapeseed meal, rice, rice flour, rye, skimmed milk powder, soy protein concentrate, soy protein isolate, soybean hulls, soybean meal, sugar beet pulp, sunflower seed meal, triticale, wheat, wheat bran, wheat flour, wheat gluten feed, wheat gluten meal, hydrolyzed wheat gluten meal, wheat middlings, wheat distillers dried grains with solubles, whey permeate, acid whey powder, sweet whey powder, delactosed whey powder, and whey protein concentrate. For each feed ingredient, the data storage stores a nutrient contents thereof.

The feed composition may be output for a single animal or for a group of animals, such as a herd, plural animals in a stable, etc. The animal is preferably a non-human animal. The instructions for feeding the animal may, for example, be formed by printed (e.g. paper) instructions, by electronically displayed instructions, e.g. on a display, or by electronic instructions, such as data transmitted in electronic format, e.g. over the internet.

The nutrient may be any suitable nutrient, such as, without limitation, protein, carbohydrate, non-starch polysaccharide, starch, fat, and fiber. The nutrient may be understood as a group of nutritional substances. For example, the nutrient protein may be understood as a chain or chains of amino acids. The nutrient protein may comprise, inter alia, amino acid chains built from amino acids, such as Histidine, Arginine, Alanine, Isoleucine, Cysteine, Aspartic acid, Leucine, Glutamine, Asparagine, Lysine, Glycine, Glutamic acid, Methionine, Proline, Serine, Phenylalanine, Tyrosine, Selenocysteine, Threonine, Pyrrolysine, Tryptophan, Valine (V).

As another example, the nutrient starch may be understood as a polymeric carbohydrate consisting of a large number of glucose units joined by glycosidic bonds. For example, the nutrient starch may comprise amylose and/or amylopectin.

The nutrient fiber, also referred to as dietary fiber, may be understood as a portion of (e.g. plant-derived) feed that is not starch and that cannot be completely broken down by digestive enzymes in a digestive tract of the animal. The nutrient fiber may comprise, inter alia, cellulose, hemicelluloses (both insoluble, e.g., arabinogalactans, glucans, arabinoxylans, glucuronoxylans, xyloglucans, galactomannans, and pectin substances, and soluble, e.g., beta-glucans, pectins, galactomannans, guar gums, and fructans), lignins, chitins, and oligosaccharides (e.g., FOS, GOS, XOS, AXOS, Raffinose, Stachyose, Verbascose).

The nutrient fat may be understood as a glycerol chain esterified with one, two, or three fatty acid chains. Thus, the nutrient fat may be understood to comprise fatty acids which may be understood as a carboxylic acid with a long aliphatic chain. The fatty acid may, inter alia, comprise non-saturated fatty acids, saturated fatty acids and trans acids. Examples of saturated fatty acids may be Caproic acid, Caprylic acid, Capric acid, Lauric acid, Myristic Acid, Palmitic acid, Stearic acid, Arachidic acid, Behenic acid, Lignocenic acid, and Cerotic Acid. Examples of non-saturated fatty acids may be:

- Mono-unsaturated fatty acid such as Crotonic acid Myristoleic, Palmitoleic acid, Sapienic acid, Oleic acid, Elaidic acid, Vaccenic acid, Gadoleic, Eicosenoic acid, Erucic acid and Nervonic acid,
- Di-unsaturated fatty acid such as Linoleic acid, Eicosadienoic acid, Docosadienoic acid,
- Tri-unsaturated fatty acids such as Linolenic acid, Pinolenic acid, Eleostearic acid, Mead acid, Dihomo-γ-linolenic acid, Eicosatrienoic acid,
- Tetra-unsaturated fatty acids such as Stearidonic acid, Arachidonic acid, Eicosatetraenoic acid, Adrenic acid,
- Pentaunsaturated fatty acids such as Bosseopentaenoic acid, Eicosapentaenoic acid, Ozubondo acid, Sardine acid, Tetracosanolpentaenoic acid,
- Hexa-unsaturated fatty acids such as Docosahexaenoic acid, Herring acid.

The digestion rate may be understood as a rate (e.g. speed) with which the animal may digest a fraction of the respective nutrient, or with which a fraction of a nutrient is degraded in the animal, and may for example be expressed as a degradation in a time from intake by the animal or as a degradation in a time from gastric emptying by the animal.

The first, second and third digestion rates may each be defined by ranges of digestion rates, e.g. mutually exclusive ranges of digestion rates. The first, second and third digestion rates may differ per nutrient or may be the same. For example, for the nutrient fiber, the digestion rates may be slower than for protein and starch, while the digestion rates of protein and starch may be the same.

The feed ingredients data storage may be formed by a collection of data stored in any suitable (e.g. electronically accessible) memory structure.

The nutrient regime data storage may be formed by a collection of data stored in any suitable (e.g. electronically accessible) memory structure.

The nutrient regime data storage and the feed ingredients data storage may be formed by separate data storage means, e.g. separate (data storage) memories. Alternatively, the nutrient regime data and the feed ingredients data storage may be formed by respective parts of a single data storage means, e.g. respective memory parts of a data storage memory.

The term content of a nutrient may be understood as a weight content or weight fraction of the feed ingredient, e.g. a percentage or fraction of the weight of the feed ingredient that is formed by the nutrient. E.g., total protein content may be expressed in g/kg feed material. The digestible protein fractions may be subsequently be expressed as % or weights of the total protein content.

The feed composition processor may be any suitable data processor, such as a microprocessor, provided with suitable program instructions to perform the described tasks. The feed composition of the feed as to be provided to the animal is to be understood as a combination of one or more of the feed ingredients as listed in the feed ingredients data storage, examples of the feed ingredients being listed elsewhere in the present document. The feed composition may, for example, express an amount of one or more of the feed ingredients to be administered to the animal, e.g. as a daily ration, a twice daily ration, a weekly ration, a monthly ration, a ration based on certain condition, requirement of an animal, etc.

The term digestion may be defined as a degradation of the feed ingredients or nutrients by enzymes, e.g. in the digestive tract.

The term fermentation may be defined as a degradation of the feed ingredients or nutrients by microbes, e.g. in the digestive tract.

According to the invention, a feed ingredient data storage stores, for plural feed ingredients, a nutrient content. More specifically, for at least one nutrient, preferably for at least two nutrients, the respective nutrient content is subdivided in three parts, namely a content of a first fraction of the nutrient exhibiting a first digestion rate, a content of a second fraction of the nutrient exhibiting a second digestion rate and a content of a third fraction of the nutrient exhibiting a third digestion rate. The first, second and third fraction together may form a total of the nutrient as comprised in the feed ingredient. Alternatively, one or more further parts of the nutrient may be comprised in the feed ingredient. For example, a fourth (e.g. remaining) fraction may be provided, e.g. having a fourth digestion rate.

In an embodiment, the feed ingredients data storage comprises for each feed ingredient at least data of content of at least one nutrient, preferably of at least two, three, four, five, or more nutrients; and data regarding the fraction of said at least one nutrient, preferably at least two, three, four, five, or more nutrients, that exhibits a first, second, third, fourth, and so on, degradation (digestion) rate, preferably for a variety of nutrients. In an embodiment, the feed ingredients data storage comprises the above data for at least one, preferably at least two, more preferably all three, of the nutrients protein, starch, and fiber.

The digestion rates may be determined in various ways. For example, the digestion rates may be determined by testing on living animals, e.g. measuring a concentration of the nutrient in a blood sample taken from the animal at various time points after intake of the feed ingredient.

As another example, a digestive tract simulation model may be built, e.g. a software simulation model, which simulates digestion and related kinetics in the animal.

As still another example, an in vitro digestive tract simulation may be performed, e.g. simulating enzymatic activity, temperature, acidic effects, bacterial/microbial activity, etc.

As yet another example, a digestion rate of different proteins, different starches and/or different fibers may be determined. For example, a digestion rate is determined of e.g. different proteins, such as casein, lactoglobulin, and the like, different fibers, such as cellulose, pectins, etc., and/or different starches, such as amylose, amylopectin, etc. Then, based on a contents of these nutrients in feed ingredients, the feed ingredients are assigned the respective digestion rates.

Due to various causes, fractions of the nutrient in the feed ingredient may digest at different rates. For example, the nutrient content in the feed ingredient may comprise various substances, such as different proteins (e.g., in the case of protein), which may be digested at a different rate. Other factors may play a role as well. For example, a fraction of the nutrient may require fermentation in the digestive tract before being able to be absorbed by the animal, etc.

According to an aspect of the invention, three digestion rates are defined, namely a first digestion rate, a second digestion rate and a third digestion rate. The first, second and third digestion rates may be different from each other. Each digestion rate may represent a degradation or fermentation in a time range, thus the first digestion rate may represent degradation in a first time range, the second digestion rate may represent degradation in a second time range and the third digestion rate may represent degradation in a third time range. The ranges may be mutually exclusive, e.g. the time ranges may be contiguous to each other.

The nutrient regime data storage stores a nutrient regime for the animal. The nutrient regime may be expressed in terms of a respective feeding amount of the first fraction of the at least one nutrient, the second fraction of the at least one nutrient and/or the third fraction of the at least one nutrient. Thus, the nutrient regime specifies at least one of the first, second and third fraction of the nutrient. The nutrient regime may specify at least two of the first, second and third fraction of the nutrient, or may specify all three of the first, second and third fraction of the nutrient. Alternatively or additionally, the nutrient regime may specify at least one of the first, second and third fraction of a first nutrient, and at least one of the first, second and third fraction of a second nutrient. The nutrient regime may further specify at least one of the first, second and third fraction of a third nutrient, fourth nutrient, and so on.

A feed composition processor connects to the feed ingredient data storage to the nutrient regime data storage.

The feed composition processor is configured, e.g. by being provided with suitable program instructions, to derive, from the nutrient regime for the animal and the information about the content of the at least one nutrient and/or the content of the fraction of the at least one nutrient having the first, second and/or third digestion rate as stored in the feed ingredient data storage for the feed ingredients, a feed composition to be fed to the animal. The feed composition may be expressed in terms of feed ingredients, e.g. amounts of respective feed ingredients to be fed to the animal. The feed composition processor composes, from one or more of the feed ingredients, the feed composition by selecting appropriate amounts of respective feed ingredients in order provide an amount of the nutrient having the first, second and/or third digestion rate, as laid down in the nutrient regime.

The feed composition processor may select the amounts of feed ingredient based on various criteria, such as least cost, availability, lowest carbon dioxide footprint, or any other suitable criterion. Thereto, the feed composition processor may incorporate a least cost function, while cost factors being assigned to each one of the feed ingredients. The feed composition processor may also select the amounts of feed ingredients based on two or more of such criteria, for example, to achieve minimal nutrient requirement for a specific animal type at least cost.

As the nutrients or fractions of the nutrients as comprised in feed ingredients may be digested by the animal in different parts of the digestive tract, the availability of the nutrient or fraction of the nutrient to the animal over time may depend, e.g. on in which fraction of the digestive tract the digestion/degradation and absorption of the nutrient or fraction of the nutrient take place. The inventors have realised that an effective modelling thereof may be implemented by providing three digestion rates. Each digestion rate may, for example, relate to digestion or degradation of a fraction of a nutrient in a different fraction of the digestive tract and/or to a different digestion mechanism. The inventors have realised that the different digestive mechanisms as involved in the digestion by the animal, may be modelled for the different nutrients by at least three digestion rates. Thus, as the nutrient regime specifies an amount of the nutrient (the first part) having the first digestion rate, an amount of the nutrient (the second part) having the second digestion rate and/or an amount of the nutrient (the third part) having the third digestion rate, and as the feed composition to be provided to the animal provides the required amount of the nutrient having the first, the second and/or the third digestion rate, a biologic availability of the nutrient to the animal may be well controlled. Accordingly, the nutrient may be made biologically available in the animal, e.g. available in a blood stream of the animal, at a desired rate.

The processor may output instructions for feeding the animal based on the feed composition. The instructions may be in the form of a feeding list which lists feed ingredients, and their respective amount, as are to be fed to the animal.

The feed composition may thus be determined based upon the nutrient regime required for a desired target effect. The desired nutrient regime may dictate that for achieving a desired target effect or two or more desired target effects, a specific amount of the at least one nutrient having the first, second, and/or third digestion rate should be included in the feed composition.

Using the system taught herein, delivery of the at least one nutrient, preferably selected from protein, starch and fiber, to specific sections of the digestive tract of the animal may be controlled over time. As the different digestion rates relate to a digestion of the nutrient in different sections of the digestive tract of the animal, controlling amounts of at least two of the nutrients protein, starch and fiber to be digested in sections of the digestive tract of the animal, may promote a co-ordinated timing of biologic availability of at least two of the nutrients protein, starch and fiber. As a result of the coordinated timing, a coordinated timing of biologic availability of the nutrients in the animal may be provided, which may promote animal performance (e.g. growth, milk production, feed intake, feed efficiency, etcetera), GI tract, intestinal development, and/or gut health.

In an embodiment, the at least one nutrient comprises at least one of protein, starch and fiber, the feed ingredient data storage having stored therein for the plural feed ingredients, the respective nutrient content of
- the fraction of the at least one of protein, starch and fiber having the first digestion rate,
- the fraction of the at least one of protein, starch and fiber having the second digestion rate and
- the fraction of the at least one of protein, starch and fiber having the third digestion rate.

It has been found that nutrient regimes based on such fraction(s) provide excellent feeding regimes or feed compositions for achieving a desired target effect. A biological availability over time of protein, starch and/or fiber may be controlled, thereby promoting a desired development of the animal.

In an embodiment, the nutrients comprise at least two of protein, starch and fiber, the feed ingredient data storage having stored therein for the plural feed ingredients the respective nutrient content of
- the respective fraction of the at least two of protein, starch and fiber having the first digestion rate,
- the respective fraction of the at least two of protein, starch and fiber having the second digestion rate and
- the respective fraction of the at least two of protein, starch and fiber having the third digestion rate.

It has been found that nutrient regimes based on such fraction provide excellent feed compositions for achieving a desired target effect. The nutrient regime may thus be tailored to achieve a desired effect. A biological availability over time of at least two of protein, starch and/or fiber may be controlled, thereby promoting a desired development of the animal.

In an embodiment, the digestion rates of protein and starch are taken into account. Accordingly, in an embodiment, the nutrients comprise protein and starch, the feed ingredient data storage having stored therein for the plural feed ingredients:
- the first fraction of the protein having the first digestion rate,
- the second fraction of the protein having the second digestion rate,
- the third fraction of the protein having the third digestion rate,
- the first fraction of the starch having the first digestion rate,
- the second fraction of the starch having the second digestion rate, and
  - the third fraction of the starch having the third digestion rate. A biological availability over time of both protein and starch may be controlled, thereby enabling to tailor a supply of these nutritional substances over time, promoting a desired development of the animal.

Preferably, the nutrient regime as stored in the nutrient regime data storage comprises
- at least one of the first fraction of the protein having the first digestion rate, the second fraction of the protein having the second digestion rate, the third fraction of the protein having the third digestion rate, and
- at least one of the first fraction of the starch having the first digestion rate, the second fraction of the starch having the second digestion rate, the third fraction of the starch having the third digestion rate.

Muscle protein synthesis may require amino acids and energy available at the same time at the desired location in the muscle cell. The delivery of protein and starch using digestion rates may, therefore, be synergized and may enable diet formulation to attempt to deliver amino acids (i. e., digested protein) and energy (i. e., digested starch) at a similar time-point and/or to sustain this delivery for a period of time postprandially.

In an embodiment, the at least two nutrients comprise protein and fiber, the feed ingredient data storage having stored therein for the plural feed ingredients:
- the first fraction of the protein having the first digestion rate,
- the second fraction of the protein having the second digestion rate,
- the third fraction of the protein having the third digestion rate,
- the first fraction of the fiber having the first digestion rate,
- the second fraction of the fiber having the second digestion rate, and
- the third fraction of the fiber having the third digestion rate,
wherein the nutrient regime as stored in the nutrient regime data storage comprises:
- at least one of the first fraction of the protein having the first digestion rate, the second fraction of the protein having the second digestion rate, the third fraction of the protein having the third digestion rate, and
- at least one of the first fraction of the fiber having the first digestion rate, the second fraction of the fiber having the second digestion rate, and the third fraction of the fiber having the third digestion rate.

A synergy of protein with fiber may result from a role of the fibers in controlling digesta passage rate and gastrointestinal health as a microbial substrate. For example, slowly fermentable fiber may be utilized in case of a diet that contains more resistant protein because one would prefer microbes to ferment fiber throughout the large intestine over resistant protein. The fermentation of resistant protein may lead to toxic metabolites that may cause diarrhea and reduced animal performance and health. Furthermore, the utilization of fast fermented fiber may elicit the release of metabolites beneficial to energy metabolism which may be synergistic with protein digestion rates as protein synthesis requires both amino acids and energy.

In an embodiment, the at least two nutrients comprise starch and fiber, the feed ingredient data storage having stored therein for the plural feed ingredients:
- the first fraction of the starch having the first digestion rate,
- the second fraction of the starch having the second digestion rate,
- the third fraction of the starch having the third digestion rate,
- the first fraction of the fiber having the first digestion rate,
- the second fraction of the fiber having the second digestion rate, and
- the third fraction of the fiber having the third digestion rate,
wherein the nutrient regime as stored in the nutrient regime data storage comprises
- at least one of the first fraction of the starch having the first digestion rate, the second fraction of the starch having the second digestion rate, the third fraction of the starch having the third digestion rate, and
- at least one of the first fraction of the fiber having the first digestion rate, the second fraction of the fiber having the second digestion rate, and the third fraction of the fiber having the third digestion rate.

Digestion of fiber may occur after and sometimes long after the digestion of starch. This may be synergistic with protein and starch digestion rates because fiber may provide more energy at a later point in time after a meal than starch. This may be used to provide the animal with a steady energy supply postprandially. For example, starch may be digested first and provide energy for muscle protein synthesis for a period of time. After this period of time, the animal may need to consume more feed in order to increase its energy supply. However, when combined with fiber digestion kinetics the animals energy supply postprandially may be prolonged and, therefore, the animal may not need to consume more feed or eat more meals in order to increase its energy supply.

In an embodiment, the nutrient content as stored for plural feed ingredients in the feed ingredient data storage comprises:

The first fraction of the protein having the first digestion rate, the second fraction of the protein having the second digestion rate and the third fraction of the protein having the third digestion rate, the first fraction of the starch having the first digestion rate, the second fraction of the starch having the second digestion rate and the third fraction of the starch having the third digestion rate, and the first fraction of the fiber having the first digestion rate, the second fraction of the fiber having the second digestion rate and the third fraction of the fiber having the third digestion rate, wherein preferably the nutrient regime as stored in the nutrient regime data storage comprises at least one of:

the first fraction of the protein having the first digestion rate, the second fraction of the protein having the second digestion rate, the third fraction of the protein having the third digestion rate, the first fraction of the starch having the first digestion rate, the second fraction of the starch having the second digestion rate, the third fraction of the starch having the third digestion rate, the first fraction of the fiber having the first digestion rate, the second fraction of the fiber having the second digestion rate and the third fraction of the fiber having the third digestion rate.

The feed ingredients data storage preferably comprises at least a content of protein, starch and fiber for each feed ingredient. Further, the content for each nutrient, e.g., protein, starch and fiber, may be fractionated into at least three parts having at least 3 digestion rates, e.g., a fast digestible, slow digestible and resistant protein, and/or fast digestible, slow digestible and resistant fiber, and/or fast digestible, slow digestible and resistant starch, respectively. Thus, the nutrients protein, starch and fiber may each be categorized in three groups according to their digestion rate.

The first (in casu fast) digestion rate, second (in casu slow) digestion rate, and third (in casu resistant) digestion rate may relate to a digestion or degradation in different parts of the digestive tract of the animal, for example as follows:

The fast digestible protein (in casu the fraction of the protein exhibiting the first degradation rate) may be understood as a fraction of protein present in the feed ingredient that is degraded within a predetermined time after having been consumed by the animal. In particular, the fast digestible protein may be degraded into smaller fragments either in the stomach of the animal, or in the upper small intestinal tract of the animal. The fraction of fast digestible protein may, for example, be measured using an in vitro digestion method as described above. The slow digestible protein (i.e. the fraction of the protein exhibiting the second digestion rate) may be understood as a fraction of protein that digests after a predetermined time after having been consumed by the animal. The resistant protein (i.e. the fraction of the protein exhibiting the third digestion rate) may be understood as a fraction of protein that is not digested by the animal itself, but may be fermented by bacteria, e.g. in the large intestine of the animal or not fermented in the animal.

A fast digestible starch (i.e. the fraction of the starch exhibiting the first digestion rate) may be understood as a fraction of starch that digests within a predetermined time after having been consumed by the animal. The fast digestible starch may, for example, be observed in tapioca. A slow digestible starch (i.e. the fraction of the starch exhibiting the second digestion rate) may be understood as a fraction of starch that digests after a predetermined time after having been consumed by the animal. Slow digestible starch may, for example, be observed in peas and horse beans. A resistant starch (i.e. the fraction of the starch exhibiting the third digestion rate) may be understood as an amount of starch that is not digested by the animal itself, but may be fermented by bacteria, e.g. in the large intestine of the animal or not fermented in the animal.

A fast digestible fiber (i.e. the fraction of the fiber exhibiting the first digestion rate) may be understood as a fraction of fiber that digests within a predetermined time after having been consumed by the animal. The fast digestible fiber may be understood to be water soluble in nature and may be exemplified by sugar beet pulp. A slow digestible fiber (i.e. the fraction of the fiber exhibiting the second digestion rate) may be understood as a fraction of fiber that digests after a predetermined time after having been consumed by the animal. Resistant fiber (i.e. the fraction of the fiber exhibiting the third digestion rate) may be understood as a fraction of fiber that is not digested by or degraded the animal itself. The resistant fiber may stabilize a bowel movement and improve stool quality of the animal, which may assist to prevent diarrhea. Without wishing to be bound by theory, the resistant fiber is thought to control the hind-gut passage rate.

Thus, the feeding of the animal may take account of digestion kinetics, in that the speed of digestion of the animal is taken into account. Hence, the nutrient regime may be balanced as regards the kinetics thereof, in that for each one of protein, starch and fiber, a desired amount of quickly digestible fraction, a slowly digestible fraction and resistant fraction may be specified.

A feed composition processor, such as a suitable programmed microprocessor, may be configured to derive, from the nutrient regime for the animal and the respective nutrient content per ingredient as stored in the feed ingredient data storage, a feed composition in terms of feed ingredients to be fed to the animal, the feed composition adhering to the nutrient regime, and output instructions for feeding the animal based on the feed composition.

The instructions may comprise a table of feed ingredients and amounts thereof to be mixed together and supplied to the animal. The nutrient regime may be based on the age of the animal and may be related to 1 of 2 output parameters: performance or safety. The output parameters are chosen by the customer and thereby the instructions may be made specifically for the customers' desired outcome.

In an embodiment, the fraction of the protein having the first digestion rate and the fraction of the starch having the first digestion rate are defined as a content of protein and starch that digests in less than 30 minutes after gastric emptying, and wherein the fraction of the protein having the second digestion rate and the fraction of the starch having the second digestion rate are defined as a content of protein and starch that digests in the small intestine in more than 30 minutes after gastric emptying. The fraction of protein and starch that remains and enters the large intestine may be considered resistant to digestion. The resistant protein and starch may be fermented in the large intestine or not fermented in the animal.

For example, categorisation of fast and slow protein sources may be done based on the judgement of the postprandial increase in plasma AA concentration. Therefore, the categorization based on digestion 30 minutes after gastric emptying may be utilized because starch and protein elicit a physiological response after absorption which occurs in the small intestine.

In an embodiment, for each one of the at least two nutrients, the first fractions digest in respective first digestion time ranges from gastric emptying, the second fractions digest in respective second digestion time ranges from gastric emptying, and the third fractions digest in respective third digestion time ranges from gastric emptying and wherein, for each one of the at least two nutrients, the respective first, second and third digestion time ranges are non-overlapping.

The first, second and third digestion time ranges may define the first, second and third digestion rates. The first second and third digestion time ranges may differ per nutrient or may have the same values for different nutrients.

For example, for the nutrient fiber, the digestion time ranges may be slower than for protein and starch, while the digestion time ranges of protein and starch may be the same. The first fractions digesting in a first digestion time range from gastric emptying, the second fractions digesting in a second digestion time range from gastric emptying and the third fractions digesting in a third digestion time range from gastric emptying. The first digestion rate, the second digestion rate and the third digestion rate relate to a digestion in different parts of a digestive tract of the animal. As the first digestion rate, the second digestion rate and the third digestion rate relate to a digestion in different parts of a digestive tract of the animal, the first second and third digestion time ranges may be non-overlapping in time.

In an embodiment, the fast digestible fiber is defined as a content of fiber that is fermented in the cecum, and wherein the slow digestible fiber is defined as a content of fiber that is fermented over the large intestine. The resistant fiber may be defined as a content of fiber that is not fermented in the digestive tract.

In an embodiment, the slow digestible protein and slow digestible starch represent a content of protein and starch that digests or is degraded in small intestine (e.g. a jejunum and an ileum) of the animal.

In an embodiment, the fast digestible fiber represents a content of fiber that is fermented or degraded in a cecum of the animal.

In an embodiment, the slow digestible fiber represents a content of fiber that is fermented or degraded in a large intestine of the animal.

In an embodiment, the resistant protein and resistant starch represents a content of protein and starch that is fermented or degraded in a large intestine of the animal, or that is not fermented in the animal.

In an embodiment, the resistant fiber represents a content of fiber that is not fermented in the animal.

In an embodiment, in the nutrient regime data storage nutrient regimes are stored per type of animal. Thus, for different types of animals, one or more nutrient regimes may be established to accommodate the specific nutrient requirements of the type of animal. The animal may, for example, be monogastric animal, preferably a monogastric farming animal or a monogastric companion animal, including, without limitation, swine, poultry, horses, fish and crustaceans, dogs and cats, and pseudomonogastrics such as lambs and calves.

In an embodiment, in the nutrient regime data storage nutrient regimes may be stored to promote a health status of the animal or to prevent or treat a disease status of an animal.

In order to adapt the rate of delivery of the one or more nutrients to the growth phase of the animal, in an embodiment, in the nutrient regime data storage nutrient regimes are stored per growth phase of the animal.

In an embodiment, the system further comprising a user input device configured to enable a user to provide input data, the input data representing a user selected goal, wherein the feed composition processor is configured to adapt the nutrient regime based on the user selected goal. The user input device may, for example, comprise a touch screen, a mouse, a keyboard, or any other suitable user interface device. Thus, the nutrient regime may be adjusted based on the goal as selected by the user, so that various requirements and circumstances may be taken into account. The user selected goal may comprise at least one of reduction of risk for diarrhea or increased growth and/or an increased efficiency. In the case of reduction of a risk of diarrhea, an amount of resistant dietary fiber may be increased. Increased growth may be understood as the animal having a faster rate of gain as measured by a greater average daily gain and that results in a heavier body weight at the end of a certain growth phase, as compared to a normal, regular animal development as expected with a standard feed composition. Increased efficiency may be understood as the animal requiring less feed to reach a similar body weight or average daily gain as a counterpart, as compared to normal, regular animal development as expected with a standard feed composition.

In order to adapt the nutrient regime as desired, the feed composition processor may be configured to adapt the nutrient regime based on the user selected goal by:
  amending the nutrient regime as read from the nutrient regime data storage in accordance with the selected goal.

Alternatively, various adapted nutrient regimes associated with user selectable goals may be (pre)stored in the nutrient regime data storage, and the feed composition processor may be configured to adapt the nutrient regime based on the user-selected goal by selecting from the nutrient regime data storage the adapted nutrient regime associated with the user selected goal.

The first, second and/or third fractions of the nutrient in the nutrient regime may be stored in the appropriate data storage. Alternatively, only fraction of the data may be entered, for example only the first (fast digestible) fraction of the nutrient may be entered, for example stored in the data storage after having been entered by the user via the user input device. The feed composition processor is configured to estimate from one of the feeding amount of the first fraction of the nutrient, the feeding amount of the second fraction of the nutrient and the feeding amount of the third fraction of the nutrient, another one of the feeding amount of the first fraction of the nutrient, the feeding amount of the second fraction of the nutrient and the feeding amount of the third fraction of the nutrient, and
  wherein the feed composition processor is further configured to derive the feed composition (also identified in the present document as feeding composition) using the one of the feeding amount of the first fraction of the nutrient, the feeding amount of the second fraction of the nutrient and the feeding amount of the third fraction of the nutrient, and the estimated another one of the feeding amount of the first fraction of the nutrient, the feeding amount of the second fraction of the nutrient and the feeding amount of the third fraction of the nutrient.

Thus, the remaining parts are estimated. For example, the subcategorization (fast, slow, resistant) may add to 100% of the nutrient. If a user specifies to feed 135 g/kg fast protein and does not specify about slow and resistant protein, and the user is feeding 155 g/kg total protein, then there is still a remainder of in total 20 g/kg of slow and resistant protein that may be estimated.

In an embodiment, the feed composition data storage further stores cost parameters associated with the feed ingredients, and wherein the feed composition processor is configured to optimize the feed composition based on the cost parameters. The feed composition processor may select the amounts of feed ingredient based on various criteria, such as least cost, availability, lowest carbon dioxide footprint, or any other suitable criterion. Thereto, the feed composition processor may incorporate a least cost function, while cost factors being assigned to each one of the feed ingredients. For example, different cost factors may be assigned for purchasing cost, carbon dioxide footprint, etc. Also, the cost function may take account of which ingredients are available and which not, e.g. by means of appropriate cost factors.

The system may further comprise a dispenser configured to dispense feed to the animal, the dispenser being communicatively connected to the feed composition processor for receiving from the feed composition processor the instructions for feeding the animal based on the feed composition, and wherein the dispenser is configured to dispense feed to the animal in accordance with the received instructions for feeding the animal based on the feed composition.

According to a further aspect of the invention, the inventors have devised that the nutrient kinetics as described in the present document may be applied to reduce a zinc content in the feed. Zinc, e.g. in a form of Zinc oxide or other form in the feed may assist to reduce a risk of diarrhea in the animal. It is desirable to reduce Zinc content in the feed, e.g. for environmental reasons. In order to achieve this goal, according to an embodiment of the system according to the invention, the at least two nutrients comprise protein and fiber, the feed ingredient data storage having stored therein for the plural feed ingredients:
  the first fraction of the protein having the first digestion rate, and
  the third fraction of the fiber having the third digestion rate,
  wherein the nutrient regime as stored in the nutrient regime data storage comprises:
    the first fraction of the protein having the first digestion rate, and
    the third fraction of the fiber having the third digestion rate.
  wherein the first fraction of the protein having the first digestion rate represents a content of protein that is digested in a stomach and a duodenum of the animal
  wherein the third fraction of the fiber having the third digestion rate represents a content of fiber that is not fermented in the animal.

For example, in the case of piglets, the inventors have devised that an increased amount of fast protein and an increased amount of resistant fiber in feed may assist to reduce a risk of diarrhea. In an exemplary known feeding program, for piglet body weight 6 kg-7.5 kg the first fraction of the protein may be 10% of total feed weight and the third fraction of the fiber may be 6.5% of total feed weight and for piglet body weight 7.5 kg-11.5 kg the first fraction of the protein may be 10% of total feed weight and the third fraction of the fiber may be 3.5% of total feed weight.

The inventors have devised that an increase in the first fraction of protein and a concomitant increase in the third fraction of fiber in feed may effectively reduce a risk of diarrhea.

Accordingly, in an embodiment, in the methods and systems taught herein the animals are piglets, wherein for piglets with a body weight of 6 kg-7.5 kg the first fraction of the protein may exceeds 11% of total feed weight, more preferably 12% of total feed weight, and the third fraction of the fiber may exceed 8% of total feed weight and wherein for piglets with a body weight of 7.5 kg-11.5 kg the first fraction of the protein may exceed 11% of total feed weight and the third fraction of the fiber may exceed 5% of total feed weight.

As a result, added Zinc (e.g. in a form of Zinc Oxide) may be reduced, e.g. to below 200 ppm of feed, more preferably to below 150 ppm of feed, as compared to the known feeding regime adding 2500 ppm Zinc Oxide for piglets with a body weight 6 kg-7.5 kg and 1500 ppm Zinc Oxide for piglets with a body weight of 7.5 kg-11.5 kg.

Likewise, a total content of Zinc may be reduced. Accordingly, in an embodiment, for piglets with a body weight of 6 kg-7.5 kg total Zinc may be below 1000 ppm, more preferably below 800 ppm of feed weight, most preferably below 150 ppm based on total weight of the feed, and for piglets with a body weight of 7.5 kg-11.5 kg, a total content of Zinc may be below 400 ppm, more preferably below 300 ppm, most preferably below 150 ppm, of feed weight.

According to another aspect of the invention, there is provided a method of formulating a feed composition for an animal, the method comprising:
  storing in a feed ingredient data storage for plural feed ingredients, the feed ingredients comprising at least two nutrient selected from a group comprising protein, starch and fiber,
    a content of respective first fractions of each one of the at least two nutrients exhibiting a first digestion rate, the first fractions digesting in a first digestion time range from gastric emptying,
    a content of respective second fractions of each one of the at least two nutrients exhibiting a second digestion rate, the second fractions digesting in a second digestion time range from gastric emptying, and
    a content of respective third fractions of each one of the at least two nutrients exhibiting a third digestion rate, the third fractions digesting in a third digestion time range from gastric emptying,
    the first, second and third digestion rates being different from each other, wherein the first digestion rate, the second digestion rate and the third digestion rate relate to a digestion in different parts of a digestive tract of the animal,
  determining a nutrient regime for the animal in terms of
    a respective feeding amount of at least one of
      the first fraction of one of the at least two nutrients having the first digestion rate,
      the second fraction of the one of the at least two nutrients having the second digestion rate, and
      the third fraction of the one of the at least two nutrients having the third digestion rate, and
    a respective feeding amount of at least one of
      the first fraction of another one of the at least two nutrients having the first digestion rate,
      the second fraction of the other one of the at least two nutrients having the second digestion rate, and
      the third fraction of the other one of the at least two nutrients having the third digestion rate, deriving, from the nutrient regime for the animal and the contents of the respective first, second and third fractions of the at least two nutrients as stored in the feed ingredient data storage for the feed ingredients, a feed composition in terms of feed ingredients to be fed to the animal, the feed composition adhering to the nutrient regime, and outputting instructions for dispensing the feed ingredients for feeding the animal based on the feed composition.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1:
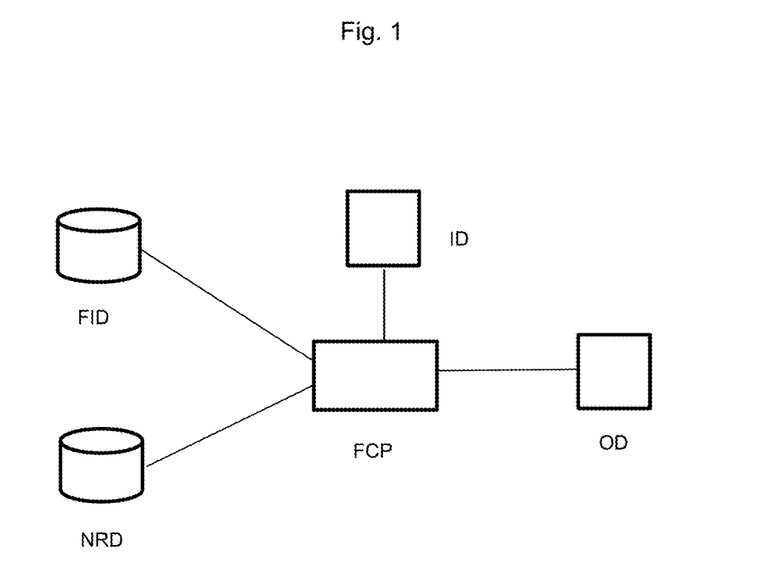
FIG. 1 depicts a block schematic view of a system according to an embodiment of the present disclosure.

FIG. 1 depicts a block schematic view of a system for formulating a feed composition of an animal. The system comprises a feed ingredients data storage FID. The feed ingredients data storage stores nutrient contents of plural feed ingredients. The feed ingredients data storage stores, per feed ingredient, respective contents of the nutrient having a respective digestion rate. More specifically, per nutrient, respective contents of the nutrient having 3 digestion rates are stored. The digestion rates may each represent a range of digestion times, in particular the ranges of digestion times may be non-overlapping and contiguous. The digestion rates represent a rate at which the fraction of the nutrient is expected to be digested by a digestive tract of the animal, so as to be available in a blood stream of the animal.

The system further comprises a nutrient regime data storage NRD in which a nutrient regime is stored for the animal. The nutrient regime is expressed in terms of amounts of nutrient to be fed to the animal, whereby the amounts of nutrient are divided in respective feeding amounts of the parts of the nutrient having the three digestion rates.

A feed composition processor FCP connects to the feed ingredients data storage and to the nutrient regime data storage, e.g. via a data bus, a data network, or any other suitable means. The feed composition processor determines, from the nutrient regime for the animal as read from the nutrient regime data storage, a feeding composition, e.g. per day, as to be fed to the animal. The feed composition is expressed in terms of amounts of feed ingredients, e.g. daily amounts of feed ingredients. Thereto, the feed composition processor derives from the nutrient regime and the contents of the feed ingredients as listed in the feed ingredients data storage, the feed composition to be fed to the animal.

The system may comprise an input device to receive user input, such as an optimisation criterion, a health state of the animal, etc that may be used by the feed composition processor as additional input to determine the feed composition.

The system further comprises an output device OD, such as a display, a printer, etc., which is connected to the feed composition processor and which outputs, e.g. displays, the feeding instructions as determined by the feed composition processor.

Figure 2:
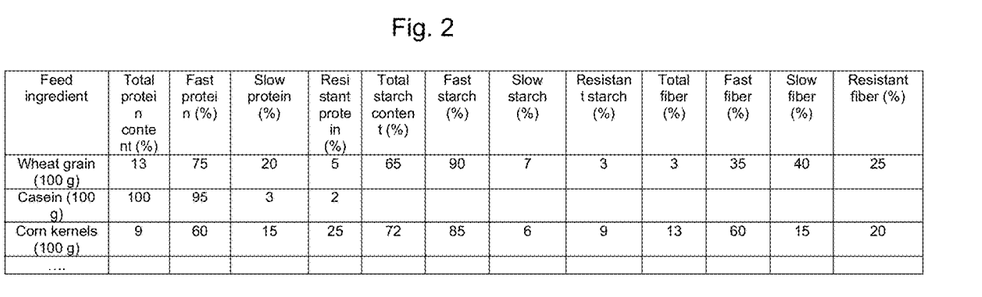
FIG. 2 depicts a table illustrating a contents of a feed ingredient data storage according to an embodiment of the present disclosure.

FIG. 2 depicts a table that illustrates a hypothetical contents of the feed ingredients data storage. In column 1, feed ingredients are listed. For each feed ingredient, the $2^{nd}$ to $5^{th}$ columns display a contents of the feed ingredient of protein, namely total protein, fast digestible protein, slow digestible protein and resistant protein. Similarly, the $6^{th}$-$9^{th}$ columns display for each feed ingredient, a contents of the feed ingredient of starch, namely total starch, fast digestible starch, slow digestible starch and resistant starch. Furthermore, the $10^{th}$-$13^{th}$ columns display for each feed ingredient, a contents of the feed ingredient of fiber, namely total fiber, fast digestible fiber, slow digestible fiber and resistant fiber. For example, 100 grams of wheat grain contain 65%, i.e. 65 grams of starch, a content of 90% of which being fast digestible starch, a content of 7% of which being slow digestible starch, and a content of 3% of which being resistant starch. Thus, 90%+7%+3% together add to 100% of the 65 grams of starch in 100 grams of wheat grain. It is noted that the numbers, i.e. contents, as entered in the tables in FIGS. 2, 4 and 5 are random, for illustrative and explanatory purpose only and may deviate in practice.

Figure 3:
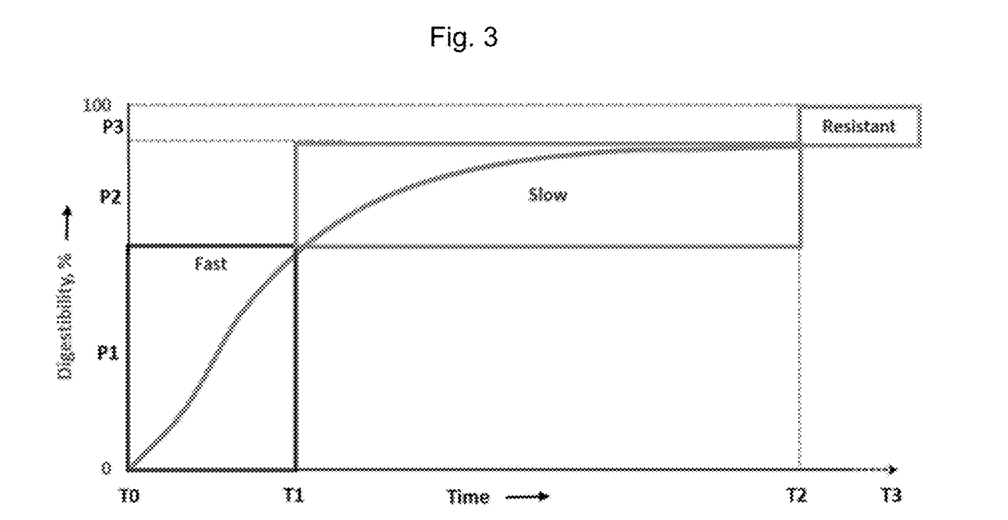
FIG. 3 depicts a graphical view of digestion versus time according to an embodiment of the present disclosure.

FIG. 3 depicts a graphical view of digestion (Y-axis) expressed as a digested percentage of a total intake of the nutrient, versus elapsed time (X-axis). The digestion initially starts at 0%, and gradually increases, towards a maximum percentage of the nutrient that is digested by the animal. In the present embodiment, the time axis is divided in three ranges, namely a first range from zero to T1, a second range from T1 to T2, and a third range exceeding T2 (e.g. from T2 to T3). Similarly, following the curve of the digestion, a first fraction P1 of the nutrient is digested in the first time range T1, a second fraction P2 of the nutrient is digested in the second time range from T1 to T2, and a third, remaining fraction P3 of the nutrient is digested in the third time range, or is not digested at all in the third time range.

The first fraction P1, second fraction P2 and third fraction P3 substantially correspond to the columns 3-5 for protein, columns 7-9 for starch and 11-13 for fiber, see FIG. 2.

Figure 4:
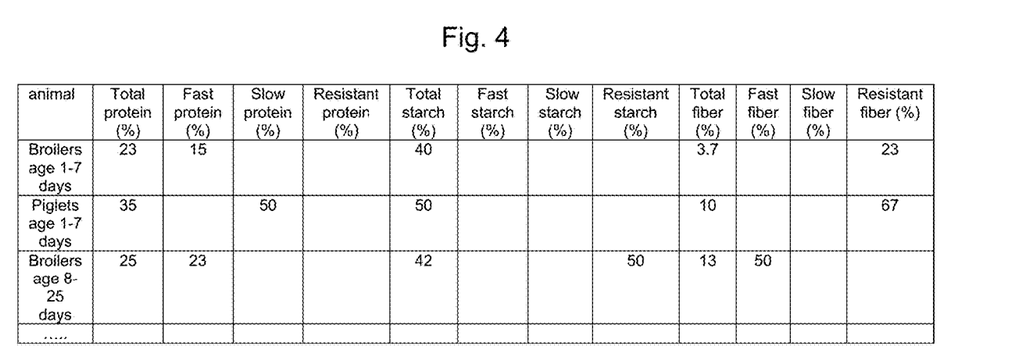
FIG. 4 depicts a table illustrating a contents of a nutrient regime data storage according to an embodiment of the present disclosure.
Figure 5:
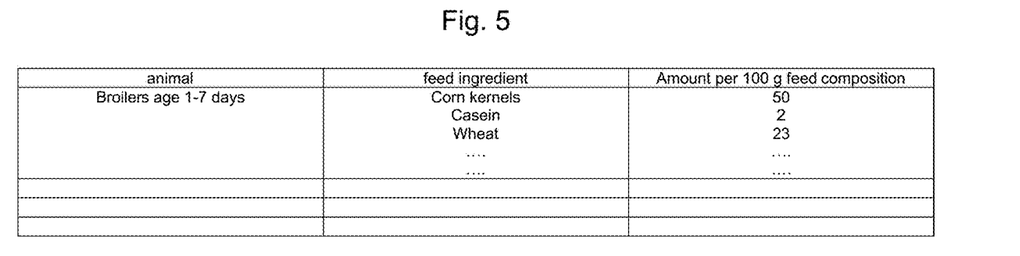
FIG. 5 depicts a table of feeding instructions according to an embodiment of the present disclosure.

FIG. 4 depicts a table that illustrates a hypothetical contents of the nutrient regime data storage. For an animal, the nutrient regime is expressed in terms of amounts of nutrient to be fed to the animal, whereby the amounts of nutrient are divided in respective feeding amounts of the parts of the nutrient having the three digestion rates. Column 1 identifies the animal (in the present example broilers age 1-7 days, piglets age 1-7 days, etc.), whereby columns 2-5 allow to define a required contents of protein, namely total protein, fast digestible protein, slow digestible protein and resistant protein. Similarly, columns 6-9 enable to define a contents of starch, namely total starch, fast digestible starch, slow digestible starch and resistant starch. Furthermore, columns 10-13 enable to define a contents of fiber, namely total fiber, fast digestible fiber, slow digestible fiber and resistant fiber. One such regime may be provided in the data storage per animal (or per group of animals). Alternatively, plural regimes may be provided per animal, e.g. depending on an age of the animal, e.g. to take account of a growth phase, depending on a health state, etc. In the present example, for broilers age 1-7 days, a total protein content of 23 percent has been specified (i.e. 23 grams per 100 gram of feed), of which 15% has been required to be fast digestible protein, thus 15% of the 23 grams protein per 100 gram of feed. Similarly, in the case of broilers age 8-25 days, a total starch content of 42%, percent, i.e. 42 grams starch per 100 grams feed, has been specified, 50%, i.e. half of which, i.e. 21 grams being required as resistant starch.

The inventors have realised that, in many ways, the animal and its gut microbiome seem to function as a closely connected unit and formulation models need to account for this symbiosis. The present invention may utilize the digestion kinetics of nutrients, such as protein and starch as well as the fermentation kinetics of fiber.

Digestion (fermentation) kinetics are expressed as the concentration of nutrient (e.g., protein, starch, or fiber) consumed per unit time and this may be considered non-linear. Least-cost feed formulation according to the state of the art is based on the principal of linearity and, therefore, it is not possible to optimize animal diets based on digestion (fermentation) kinetics.

The present invention may aim to provide a system and method for formulating feed composition based on non-linear digestion or fermentation kinetics in the digestive tract. Thus, nutrient digestion/fermentation kinetics were subcategorized into 3 degradation rates: first (e.g., fast), second (e.g., slow), and third (e.g., resistant).

FIG. 5 depicts an illustrative hypothetical example of feed instructions for feeding the animal, the feed instructions provide a feed composition for feeding the animal. The feed composition has been composed by the feed composition processor based on e.g., a least cost function on the basis of cost parameters (e.g. a cost per kilogram of feed) associated with each feed ingredient. The feed composition processor may take account of the fast, slow and resistant parts of the nutrient(s) in the various feed ingredients. For example, a feed composition for broilers age 1-7 days may comprise 50 grams per 100 grams of corn kernels, 2 gram per 100 gram of casein and 23 gram per 100 gram of wheat. For the sake of completeness, it is repeated that the numbers, i.e. contents, as entered in the table are random, for illustrative purpose only, and may deviate in practice.

Thus, an effective modelling of nutrient kinetics may be provided, taken into account the digestive behaviour of the animal, the kinetics of the feed ingredients, and resulting in a feed composition that provides a desired rate of digestion by the animal.

In piglets, as well as in other animals, diarrhea and associated health problems of the animal are of a major concern. The risk and occurrence of diarrhea is preferably reduced by a suitable feeding regime of the animal. Commonly, Zinc, e.g. in a form of Zinc Oxide, is added to the feed as this added mineral, at high inclusion levels (e.g. up to 3000 ppm), has shown to be beneficial to reduce diarrhea in these animals. However, it is desired that Zinc content in the feed is reduced, e.g. for environmental reasons. It has been found that using the methods and systems as taught in the present document, high inclusion levels of Zinc may be avoided by increasing a content of fast digestible protein and a content of resistant fiber, as compared to current feeding regimes.

For piglets with a body weight of 6 kg-7.5 kg the first (fast) fraction of the protein may be increased from approximately 10% of total feed weight to above 12%, e.g. 12.5%, of total feed weight, and the third fraction of the fiber may be increased from approximately 7% of total feed weight to above 8%, e.g. 9%, of total feed weight. For piglets with a body weight of 7.5 kg-11.5 kg the first fraction of the protein may be increased from approximately 10% of total feed weight to above 11%, e.g. 11.6%, of total feed weight, and the third fraction of the fiber may be increased from about 4% of total feed weight to above 5%, e.g. 6,1%, of total feed weight. As a result, added Zinc (e.g. in a form of Zinc Oxide) may be reduced, e.g. to below 200 ppm of feed, more preferably to 150 ppm of feed, as compared to the known feeding regime adding about 2500 ppm Zinc Oxide for piglets with a body weight of 6 kg-7.5 kg and about 1500 ppm Zinc Oxide for piglets with a body weight of 7.5 kg-11.5 kg.

The following numbered clauses form part of the description:

1. A system for formulating a feed composition for an animal, comprising:
    a feed ingredient data storage having stored therein for plural feed ingredients, the feed ingredients comprising at least one nutrient,
        a content of a first fraction of the at least one nutrient exhibiting a first digestion rate,
        a content of a second fraction of the at least one nutrient exhibiting a second digestion rate, and
        a content of a third fraction of the at least one nutrient exhibiting a third digestion rate,
        the first, second and third digestion rates being different from each other,
    a nutrient regime data storage having stored therein a nutrient regime for the animal in terms of a respective feeding amount of at least one of
        the first fraction of the at least one nutrient having the first digestion rate,
        the second fraction of the at least one nutrient having the second digestion rate, and
        the third fraction of the at least one nutrient having the third digestion rate,
    a feed composition processor communicatively connected to the feed ingredient data storage and to the nutrient regime data storage and configured
        to derive, from the nutrient regime for the animal and the contents of the first, second and third fractions of the at least one nutrient as stored in the feed ingredient data storage for the feed ingredients, a feed composition in terms of feed ingredients to be fed to the animal, the feed composition adhering to the nutrient regime, and
        to output instructions for feeding the animal based on the feed composition.

2. The system according to clause 1, wherein first digestion rate, the second digestion rate and the third digestion rate relate to a degradation in different parts of a digestive tract of the animal.

3. The system according to clause 1 or 2, wherein the feed ingredients comprise at least two nutrients, wherein the first digestion rate, the second digestion rate and the third digestion rate form contiguous ranges of digestion times.

4. The system according to any of the preceding clauses, wherein the nutrients comprise at least one of protein, starch and fiber, the feed ingredient data storage having stored therein for the plural feed ingredients, the respective nutrient content of
    the first fraction of the at least one of protein, starch and fiber having the first digestion rate,
    the second fraction of the at least one of protein, starch and fiber having the second digestion rate and
    the third fraction of the at least one of protein, starch and fiber having the third digestion rate.

5. The system according to any of the preceding clauses, wherein the nutrients comprise at least two of protein, starch and fiber, the feed ingredient data storage having stored therein for the plural feed ingredients the respective nutrient content of
- the respective first fraction of the at least two of protein, starch and fiber having the first digestion rate,
- the respective second fraction of the at least two of protein, starch and fiber having the second digestion rate and
- the respective third fraction of the at least two of protein, starch and fiber having the third digestion rate.

6. The system according to any of the preceding clauses, wherein the nutrients comprise protein and starch, the feed ingredient data storage having stored therein for the plural feed ingredients:
- the first fraction of the protein having the first digestion rate,
- the second fraction of the protein having the second digestion rate,
- the third fraction of the protein having the third digestion rate,
- the first fraction of the starch having the first digestion rate,
- the second fraction of the starch having the second digestion rate, and
- the third fraction of the starch having the third digestion rate.

7. The system according to any of any of the preceding clauses, wherein the nutrient content as stored for plural feed ingredients in the feed ingredient data storage comprises:
- the first fraction of the protein having the first digestion rate, the second fraction of the protein having the second digestion rate and the third fraction of the protein having the third digestion rate,
- the first fraction of the starch having the first digestion rate, the second fraction of the starch having the second digestion rate and the third fraction of the starch having the third digestion rate, and
- the first fraction of the fiber having the first digestion rate, the second fraction of the fiber having the second digestion rate and the third fraction of the fiber having the third digestion rate, and wherein the nutrient regime as stored in the nutrient regime data storage comprises at least one of:
- the first fraction of the protein having the first digestion rate, the second fraction of the protein having the second digestion rate, the third fraction of the protein having the third digestion rate,
- the first fraction of the starch having the first digestion rate, the second fraction of the starch having the second digestion rate, the third fraction of the starch having the third digestion rate,
- the first fraction of the fiber having the first digestion rate, the second fraction of the fiber having the second digestion rate, and the third fraction of the fiber having the third digestion rate.

8. The system according to any of clauses 4-7, wherein the first fraction of the protein having the first digestion rate and the first fraction of the starch having the first digestion rate are defined as a content of protein and starch that digests in less than 30 minutes after gastric emptying, and wherein the second fraction of the protein having the second digestion rate and the second fraction of the starch having the second digestion rate are defined as a content of protein and starch that digests in a small intestine in more than 30 minutes after gastric emptying.

9. The system according to any of clauses 4-8, wherein the first fraction of the protein having the first digestion rate and the first fraction of the starch having the first digestion rate represent a content of protein and starch that is digested in a stomach and a duodenum of the animal.

10. The system according to any of clauses 4-9, wherein the second fraction of the protein having the second digestion rate and the second fraction of the starch having the second digestion rate represent a content of protein and starch that digests in the small intestine of the animal.

11. The system according to any of clauses 4-10, wherein the first fraction of the fiber having the first digestion rate represents a content of fiber that is fermented in a cecum of the animal.

12 The system according to any of clauses 4-11, wherein the second fraction of the fiber having the second digestion rate represents a content of fiber that is fermented in a large intestine of the animal.

13. The system according to any of clauses 4-12, wherein the third fraction of the protein having the third digestion rate and the third fraction of the starch having the third digestion rate represents a content of protein and starch that is fermented in a large intestine of the animal or not fermented in the animal.

14. The system according to any of clauses 4-13, wherein the third fraction of the fiber having the third digestion rate represents a content of fiber that is not fermented in the animal.

15. The system according to any of the preceding clauses, wherein in the nutrient regime data storage nutrient regimes are stored per type of animal.

16. The system according to any of the preceding clauses, wherein in the nutrient regime data storage nutrient regimes are stored per growth phase of the animal.

17. The system according to any of the preceding clauses, further comprising a user input device configured to enable a user to provide input data, the input data representing a user selected goal, wherein the feed composition processor is configured to adapt the nutrient regime based on the user selected goal.

18. The system according to clause 17, wherein the user selected goal comprises at least one of a reduction of risk for diarrhea, a minimal nutrient requirement, an increased growth, and an increased efficiency.

19. The system according to clause 17 or 18, wherein the feed composition processor is configured to adapt the nutrient regime based on the user selected goal by:
amending the nutrient regime as read from the nutrient regime data in accordance with the selected goal.

20. The system according to clause 17 or 18, wherein adapted nutrient regimes associated with user selectable goals are stored in the nutrient regime data storage, and
- wherein the feed composition processor is configured to adapt the nutrient regime based on the user selected goal by selecting from the nutrient regime data storage the adapted nutrient regime associated with the user selected goal.

21. The system according to any of the preceding clauses, wherein the feed composition processor is configured to estimate from one of the feeding amount of the first fraction of the nutrient, the feeding amount of the second fraction of the nutrient and the feeding amount of the third fraction of the nutrient, another one of the feeding amount of the first fraction of the nutrient, the feeding amount of the second fraction of the nutrient and the feeding amount of the third fraction of the nutrient, and
- wherein the feed composition processor is further configured to derive the feed composition using the one of the feeding amount of the first fraction of the nutrient, the feeding amount of the second fraction of the nutrient and the feeding amount of the third fraction of the nutrient, and the estimated another one of the feeding amount of the first fraction of the nutrient, the feeding amount of the second fraction of the nutrient and the feeding amount of the third fraction of the nutrient.

22. The system according to any of the preceding clauses, wherein the feed composition data storage further stores cost parameters associated with the feed ingredients, and wherein the feed composition processor is configured to optimize the feed composition based on the cost parameters.

23. The system according to any of the preceding clauses, further comprising a dispenser configured to dispense feed to the animal, the dispenser being communicatively connected to a feed composition processor for receiving from the feed composition processor the instructions for feeding the animal based on the feed composition, and wherein the dispenser is configured to dispense feed to the animal in accordance with the received instructions for feeding the animal based on the feed composition, 24. A method of formulating a feed composition for an animal, the method comprising:
  storing in a feed ingredient data storage for plural feed ingredients, the feed ingredients comprising at least one nutrient,
    a content of a first fraction of the at least one nutrient exhibiting a first digestion rate,
    a content of a second fraction of the at least one nutrient exhibiting a second digestion rate and
    a content of a third fraction of the at least one nutrient exhibiting a third digestion rate,
    the first, second and third digestion rates being different from each other,
  determining a nutrient regime for the animal in terms of a respective feeding amount of at least one of
    the first fraction of the at least one nutrient having the first digestion rate,
    the second fraction of the at least one nutrient having the second digestion rate, and
    the third fraction of the at least one nutrient having the third digestion rate.
  deriving, from the nutrient regime for the animal and the contents of the first, second and third parts of the at least one nutrient as stored in the feed ingredient data storage for the feed ingredients, a feed composition in terms of feed ingredients to be fed to the animal, the feed composition adhering to the nutrient regime, and
  outputting instructions for feeding the animal based on the feed composition.

The invention claimed is:

1. A system for formulating a feed composition for an animal, comprising:
  (a) a feed ingredient data storage having stored therein for plural feed ingredients, the feed ingredients comprising at least two nutrients selected from a group consisting of protein, starch and fiber,
  (b) a content of respective first fractions of each one of the at least two nutrients exhibiting a first digestion rate,
  (c) a content of respective second fractions of each one of the at least two nutrients exhibiting a second digestion rate, and
  (d) a content of respective third fractions of each one of the at least two nutrients exhibiting a third digestion rate,
  wherein the first, second and third digestion rates are different from each other, and
  wherein the first digestion rate, the second digestion rate and the third digestion rate relate to a digestion in different parts of a digestive tract of the animal,
  (e) a nutrient regime data storage having stored therein:
    (i) data on a nutrient regime for the animal in terms of a respective feeding amount of at least one of
      (A) the first fraction of one of the at least two nutrients having the first digestion rate,
      (Bi) the second fraction of the one of the at least two nutrients having the second digestion rate, and
      (C) the third fraction of the one of the at least two nutrients having the third digestion rate, and
    (ii) data on a respective feeding amount of at least one of:
      (A) the first fraction of another one of the at least two nutrients having the first digestion rate,
      (B) the second fraction of the other one of the at least two nutrients having the second digestion rate, and
      (C) the third fraction of the other one of the at least two nutrients having the third digestion rate,
  (f) a feed composition processor communicatively connected to the feed ingredient data storage and to the nutrient regime data storage and configured to
    (i) derive, from the nutrient regime for the animal and the contents of the respective first, second and third fractions of the at least two nutrients as stored in the feed ingredient data storage for the feed ingredients, a feed composition in terms of feed ingredients to be fed to the animal, the feed composition adhering to the nutrient regime, and
    (ii) output instructions for dispensing the feed ingredients for feeding the animal based on the feed composition.

2. The system according to claim 1, wherein the at least two nutrients comprise protein and starch, the feed ingredient data storage having stored therein for the plural feed ingredients:
  (a) the first fraction of the protein having the first digestion rate,
  (b) the second fraction of the protein having the second digestion rate,
  (c) the third fraction of the protein having the third digestion rate,
  (d) the first fraction of the starch having the first digestion rate,
  (e) the second fraction of the starch having the second digestion rate, and
  (f) the third fraction of the starch having the third digestion rate,
wherein the nutrient regime data comprises:
  (i) at least one of the first fraction of the protein having the first digestion rate, the second fraction of the protein having the second digestion rate, the third fraction of the protein having the third digestion rate, and
  (ii) at least one of the first fraction of the starch having the first digestion rate, the second fraction of the starch having the second digestion rate, the third fraction of the starch having the third digestion rate.

3. The system according to claim 1, wherein the at least two nutrients comprise protein and fiber, the feed ingredient data storage having stored therein for the plural feed ingredients:
  (a) the first fraction of the protein having the first digestion rate,
  (b) the second fraction of the protein having the second digestion rate, (c) the third fraction of the protein having the third digestion rate,
(d) the first fraction of the fiber having the first digestion rate,
(e) the second fraction of the fiber having the second digestion rate, and
(f) the third fraction of the fiber having the third digestion rate,
wherein the nutrient regime data storage comprises:
  (i) at least one of the first fraction of the protein having the first digestion rate, the second fraction of the protein having the second digestion rate, the third fraction of the protein having the third digestion rate, and
  (ii) at least one of the first fraction of the fiber having the first digestion rate, the second fraction of the fiber having the second digestion rate, and the third fraction of the fiber having the third digestion rate.

4. The system according to claim 1, wherein the at least two nutrients comprise starch and fiber, the feed ingredient data comprising:
  (a) the first fraction of the starch having the first digestion rate,
  (b) the second fraction of the starch having the second digestion rate,
  (c) the third fraction of the starch having the third digestion rate,
  (d) the first fraction of the fiber having the first digestion rate,
  (e) the second fraction of the fiber having the second digestion rate, and
  (f) the third fraction of the fiber having the third digestion rate,
wherein the nutrient regime data comprises:
  (i) at least one of the first fraction of the starch having the first digestion rate, the second fraction of the starch having the second digestion rate, the third fraction of the starch having the third digestion rate, and
  (ii) at least one of the first fraction of the fiber having the first digestion rate, the second fraction of the fiber having the second digestion rate, and the third fraction of the fiber having the third digestion rate.

5. The system according to claim 1, wherein the nutrient content comprises:
  (a) the first fraction of the protein having the first digestion rate, the second fraction of the protein having the second digestion rate and the third fraction of the protein having the third digestion rate,
  (b) the first fraction of the starch having the first digestion rate, the second fraction of the starch having the second digestion rate and the third fraction of the starch having the third digestion rate, and
  (c) the first fraction of the fiber having the first digestion rate, the second fraction of the fiber having the second digestion rate and the third fraction of the fiber having the third digestion rate, and
  wherein the nutrient regime data comprises at least one of:
  (i) the first fraction of the protein having the first digestion rate, the second fraction of the protein having the second digestion rate, the third fraction of the protein having the third digestion rate,
  (ii) the first fraction of the starch having the first digestion rate, the second fraction of the starch having the second digestion rate, the third fraction of the starch having the third digestion rate,
  (iii) the first fraction of the fiber having the first digestion rate, the second fraction of the fiber having the second digestion rate, and the third fraction of the fiber having the third digestion rate.

6. The system according to claim 1, wherein the feed ingredients comprise at least two nutrients, wherein the first digestion rate, the second digestion rate and the third digestion rate form contiguous ranges of digestion times.

7. The system according to claim 1, wherein for each one of the at least two nutrients, the first fractions digesting in respective first digestion time ranges from gastric emptying, the second fractions digesting in respective second digestion time ranges from gastric emptying, and the third fractions digesting in respective third digestion time ranges from gastric emptying and wherein, for each one of the at least two nutrients, the respective first, second and third digestion time ranges are non-overlapping.

8. The system according to claim 1, wherein the first fraction of the protein having the first digestion rate and the first fraction of the starch having the first digestion rate are defined as a content of protein and starch that digests in less than 30 minutes after gastric emptying, and wherein the second fraction of the protein having the second digestion rate and the second fraction of the starch having the second digestion rate are defined as a content of protein and starch that digests in a small intestine in more than 30 minutes after gastric emptying.

9. The system according to claim 1, wherein the first digestion rate, the second digestion rate and the third digestion rate relate to a degradation in different parts of a digestive tract of the animal.

10. The system according to claim 1, wherein the first fraction of the protein having the first digestion rate and the first fraction of the starch having the first digestion rate represent a content of protein and starch that is digested in a stomach and a duodenum of the animal.

11. The system according to claim 1, wherein the second fraction of the protein having the second digestion rate and the second fraction of the starch having the second digestion rate represent a content of protein and starch that digests in the small intestine of the animal.

12. The system according to claim 1, wherein the first fraction of the fiber having the first digestion rate represents a content of fiber that is fermented in a cecum of the animal.

13. The system according to claim 1, wherein the second fraction of the fiber having the second digestion rate represents a content of fiber that is fermented in a large intestine of the animal.

14. The system according to claim 1, wherein the third fraction of the protein having the third digestion rate and the third fraction of the starch having the third digestion rate represents a content of protein and starch that is fermented in a large intestine of the animal or not fermented in the animal.

15. The system according to claim 1, wherein the third fraction of the fiber having the third digestion rate represents a content of fiber that is not fermented in the animal.

16. The system according to claim 1, wherein in the nutrient regime data storage nutrient regimes are stored per type of animal.

17. The system according to claim 1, wherein in the nutrient regime data storage nutrient regimes are stored per growth phase of the animal.

18. The system according to claim 1, further comprising a user input device configured to enable a user to provide input data representing a user selected goal, wherein the feed composition processor is configured to adapt the nutrient regime based on the user selected goal.

19. The system according to claim 18, wherein the user selected goal comprises at least one of a reduction of risk for diarrhea, a minimal nutrient requirement, an increased growth, and an increased efficiency.

20. The system according to claim 1, further comprising a user input device configured to enable the user to provide input data representing a user selected goal, wherein the feed composition processor is configured to adapt the nutrient regime based on the user selected goal, wherein the feed composition processor is configured to adapt the nutrient regime based on the user selected goal by amending the nutrient regime as read from the nutrient regime data in accordance with the selected goal.

21. The system according to claim 1, further comprising a user input device configured to enable the user to provide input data representing a user selected goal, wherein the feed composition processor is configured to adapt the nutrient regime based on the user selected goal, wherein adapted nutrient regimes associated with user selectable goals are stored in the nutrient regime data storage, and wherein the feed composition processor is configured to adapt the nutrient regime based on the user selected goal by selecting from the nutrient regime data storage the adapted nutrient regime associated with the user selected goal.

22. The system according to claim 1, wherein the feed composition processor is configured to estimate from one of the feeding amount of the first fraction of the nutrient, the feeding amount of the second fraction of the nutrient and the feeding amount of the third fraction of the nutrient, another one of the feeding amount of the first fraction of the nutrient, the feeding amount of the second fraction of the nutrient and the feeding amount of the third fraction of the nutrient, and wherein the feed composition processor is further configured to derive the feed composition using the one of the feeding amount of the first fraction of the nutrient, the feeding amount of the second fraction of the nutrient and the feeding amount of the third fraction of the nutrient, and the estimated another one of the feeding amount of the first fraction of the nutrient, the feeding amount of the second fraction of the nutrient and the feeding amount of the third fraction of the nutrient.

23. The system according to claim 1, wherein the feed composition data storage further stores cost parameters associated with the feed ingredients, and wherein the feed composition processor is configured to optimize the feed composition based on the cost parameters.

24. The system according to claim 1, further comprising a dispenser configured to dispense feed to the animal, the dispenser being communicatively connected to a feed composition processor for receiving from the feed composition processor the instructions for feeding the animal based on the feed composition, and wherein the dispenser is configured to dispense feed to the animal in accordance with the received instructions for feeding the animal based on the feed composition.

25. The system according to claim 1, wherein the at least two nutrients comprise protein and fiber, the feed ingredient data comprising:
   (a) the first fraction of the protein having the first digestion rate, and
   (b) the third fraction of the fiber having the third digestion rate,
wherein the nutrient regime as stored in the nutrient regime data storage comprises:
   (i) the first fraction of the protein having the first digestion rate, and
   (ii) the third fraction of the fiber having the third digestion rate,
wherein the first fraction of the protein having the first digestion rate represents a content of protein that is digested in a stomach and a duodenum of the animal,
wherein the third fraction of the fiber having the third digestion rate represents a content of fiber that is not fermented in the animal.

26. The system according to claim 25, wherein the animals are piglets, wherein for piglets with a body weight of 6 kg-7.5 kg the first fraction of the protein exceeds 11% of total feed weight and the third fraction of the fiber exceeds 8% of total feed weight, and wherein for piglets with a body weight of 7.5 kg-11.5 kg the first fraction of the protein exceeds 11% of total feed weight and the third fraction of the fiber exceeds 5% of total feed weight.

27. The system according to claim 25, wherein added Zinc is below 150 ppm of total feed weight.

* * * * *